United States Patent Office 2,717,219
Patented Sept. 6, 1955

2,717,219

ASBESTOS FIBER ELECTRICAL INSULATING MEMBER IMPREGNATED WITH METHYL HYDROGEN POLYSILOXANE

James G. Ford, Sharon, and Clinton L. Denault, Sharpsville, Pa., assignors to Westinghouse Electric Corporation, East Pittsburgh, Pa., a corporation of Pennsylvania No Drawing. Application March 29, 1952, Serial No. 279,458

4 Claims. (Cl. 117—126)

This invention relates to electrical insulators comprising inorganic materials and particularly cementitious members and structures treated with methyl hydrogen polysiloxane resins.

In the electrical industry, molded inorganic cementitious members are employed to a considerable extent. Many parts of switchgear, such as splitter plates and arc confining channels are prepared from molded inorganic compositions, for example, cement and asbestos compositions. These compositions are being employed as cleats, supports and brackets for electrical conductors in reactors and transformers. A substantial amount of such inorganic members are exposed to high temperatures, as for example near arcing contacts, and are exposed to high voltages. It is well known that the electrical resistance of the cementitious inorganic structures varies markedly with the humidity of the atmosphere and the electrical resistance may change in the order of 1,000 between a dry day and a damp day.

While it has been proposed heretofore to impregnate or coat cementitious inorganic members with organic resins, certain difficulties have been encountered due to the alkaline nature of these members. A further shortcoming arising from the use of conventional organic resins in the treatment of cementitious inorganic members arises when the members are employed adjacent to electrical arcs. The heat of the arc carbonizes ordinary organic resins and produces carbon deposits that are conductive. In some cases, failure of switchgear has been traced to such carbon deposits.

It has been proposed to coat or treat cementitious inorganic members with organosilicon compositions and resins. We have found that the coating of cementitious inorganic members with hydrocarbon polysiloxanes, such as phenyl methyl siloxane resins and dimethyl silicones, while giving a measure of moisture resistance to the members, will result in electrically conductive carbonaceous deposits after the members have been exposed to electrical arcs. Substantial conductivities are evidenced after the hydrocarbon siloxane coated members have been exposed to electrical arcs and, therefore, these hydrocarbon siloxanes have not proven satisfactory. Vapors of silanes also have been applied to such members and found to be unsatisfactory in producing a satisfactory degree of moisture resistance. In many instances, if sufficient silane is vaporized upon the members, a carbon residue is evidenced after arcing takes place near such treated members.

We are acquainted with Patent 2,474,704 disclosing the application of vapors of a methylhydrogenethoxysilane to members to impart waterproofness thereto. We have conducted experiments therewith on cementitious inorganic members and have been unable to secure a sufficiently low degree of water absorption and adequate dielectric strength in the materials so treated.

The object of this invention is to provide an inorganic electrically insulating material treated with a methylhydrogenpolysiloxane resin to impart a high degree of resistance to water absorption, a high dielectric strength and maintenance of high insulation resistance when exposed to electrical arcs.

Another object of this invention is to provide a process for treating inorganic members with a methylhydrogenpolysiloxane resin and heat treating the applied resin to produce highly insulating members resistant to loss of insulation when exposed to high humidities and elevated temperatures.

Other objects of the invention will in part be obvious and will in part appear hereinafter. For a better understanding of the nature and objects of the invention, reference may be had to the following detailed description.

In accordance with the present invention, it has been discovered that molded inorganic members may be treated with at least 2% by weight of a methylhydrogenpolysiloxane resin, particularly good results being had with from 8% to 11% by weight of the resin, and after heat treating the applied resin the inorganic member will possess improved electrical properties that will be maintained even under adverse humidity and temperature conditions, as well as after exposure to arcs.

The cementitious inorganic members of the present invention comprise hardenable inorganic cements and inorganic fillers, particularly asbestos fibers, along with powdered inorganic solids such as barytes, slate and mica. Suitable compositions may comprise from 25 to 75 parts by weight of Portland cement combined with from 25 to 75 parts by weight of asbestos fibers. This asbestos fiber and Portland cement composition is widely used in the electrical industry. It may be modified by adding thereto up to 25 parts by weight of one of the inorganic solids mentioned for each 100 parts of the mixture.

The Portland cement and asbestos fibers, with or without the added finely pulverized inorganic solid, is mixed dry in a conventional mixing and kneading machine for a period of time of the order of one hour. Longer mixing is possible but no particular benefits accrue therefrom. The mixture of cement and asbesto, and inorganic solids, if any, is then moistened with water. For most purposes, the amount of water may vary from 12% to 25% of the weight of the mixture. The water may be added while the mixture is in the mixing and kneading machine. After the water has been thoroughly worked into the mixture to secure uniform distribution thereof, the wet mix is passed through a screen not exceeding one-half inch mesh to break up lumps. The wet and screened mixture should be promptly molded, ordinarily within two hours after water is added, to secure the best results. The wetted mixture of asbestos and Portland cement may be molded by any of the well-known conventional procedures. In many cases, the mixture is molded by introducing a weighed amount of the mixture into a metal mold and pressing the mixture under a pressure of from 5 pounds to 100 pounds per square inch. The pressed members are removed from the mold and placed upon a pallet and then air dried for as much as 12 to 24 hours. The air dried molded members have substantial strength and may be finished by filing, sanding or the like to remove fins and to smooth off corners and the like. The air dried members also may be sawed or drilled or machined to size and shape if required.

After having been air dried and finished or otherwise machined, the members are placed in a steam oven or equivalent steaming device. Steam at approximately 100° C. is suitable for this treatment although the temperature may vary from slightly below or to as much as 125° C. or higher. Steaming for 24 to 96 hours will produce a relatively hard cementitious member. In order to remove any excess of moisture from the steam cured member, it may be first air dried and then drying completed in an oven beginning at a temperature of about 100° C. and gradually increasing the temperature to as much as 225° C. and maintaining in the oven for several hours. When cooled, the members will be relatively hard. The electrical properties of the members will vary considerably with the weather and the electrical ohmic resistance will change more than 1,000 times between a dry day and a day having high humidity.

In order to provide for improved resistance to humidity, we treat the hardened cementitious members with a solution comprising a linear polysiloxane having the recurring group

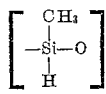

and end-blocking groups comprising $(CH_3)_3Si$. The polysiloxane is preferably applied in a suitable solvent, such as toluene, the solutions having from 10% to 40%, for instance, of the linear polysiloxane dissolved therein. The cured inorganic members which may be simply immersed in the solution for several hours or they may be treated with the solution by vacuum and pressure impregnation. In any event, the immersion or impregnation should be sufficient to apply at least 2%, based on the weight of the inorganic members, of the linear methyl hydrogen polysiloxane resin thereto. After the treatment, the members are removed from the solution, briefly drained and then heat treated at a temperature from about 140° C. to about 300° C. for several hours. We have secured the best results when the heat treatment has been applied at temperatures of from 200 to 300° C. for from 6 to 8 hours.

The following examples illustrate the practice of the invention.

EXAMPLE I

Into a Werner and Pfleiderer mixer, there was introduced 50 pounds by weight of Portland cement and 50 pounds by weight of asbestos fibers. The mixer was operated for one hour and then 20 pounds of water was sprinkled into the mixture while the mixer was operating. After an additional 20 minutes of mixing, the wetted mixture was dumped and rubbed through a quarter inch mesh screen. The wet mixture was weighed out and placed within steel molds and pressed into arc chute plates. After being pressed, the plates were moved from the mold and air dried for 12 hours after which the air dried plates were sanded and machined. The sanded and machined plates were put into a steam chest into which steam was admitted at atmospheric pressure and the plates were held for 48 hours in the chest. The plates were removed from the steam chest, dried in air for 12 hours to remove excess moisture, and thereafter the plates were transferred to an oven at a temperature of 100° C. The oven temperature was slowly increased over the period of one hour to 200° C. and the plates were left in the oven for eight hours at the maximum temperature. The plates were placed in a vacuum impregnating tank, evacuated to an absolute pressure of below 5 inches of mercury, and flooded with a solution comprising 40% by weight of a linear methylhydrogenpolysiloxane containing end-blocking trimethyl silyl groups, the balance being a volatile organic solvent. Nitrogen gas at a pressure of 100 pounds per square inch was applied to the solution to force it into the cementitious plates. After 30 minutes, the pressure was reduced to atmospheric, the plates were withdrawn from the tank, drained for 5 minutes and then placed in an oven where they were heated for 6 hours at 250° C.

The resulting treated plates were then subjected to an atmosphere of 100% relative humidity at 30° C. for 44 hours, and 3/16 inch thick plates had an insulation resistance of 78 megohms after the treatment. Plates baked for 8 hours at 300° C. had an insulation resistance of 180 megohms after the same humidification treatment. When subjected to electrical arcing, we were unable to find any evidence of conducting material being formed on the surface of the plates.

In another test, 1/4 inch thick asbestos plates prepared as disclosed in the example were treated by impregnation in the methylhydrogenpolysiloxane resin. After baking at 250° C. for 6 hours, it was found that approximately 9.4% by weight of the methylhydrogensiloxane resin had been impregnated into the members. For comparative purposes, similar asbestos-Portland cement members were exposed to the vapors of a methylhydrogendiethoxysilane for 24 hours. Following this, the members were removed and baked for 5 minutes at 150° C. The following table indicates the dielectric strength of both treated and untreated members.

Table

| Impregnant in Asbestos Members | Dielectric Strength, Volts per Mil |
|---|---|
| None | 24 |
| Methyl hydrogen polysiloxane resin | 87 |
| $(CH_3)HSi(OC_2H_5)_2$ | 37 |

The improvement produced by use of the resin is outstanding.

We have employed members produced in accordance with the present invention in electrical apparatus and particularly adjacent to electrical arcs and have found the material to be completely satisfactory under adverse conditions of atmosphere. No failure or unsatisfactory results were obtained in service.

Since certain changes may be made in the above invention and different embodiments of the invention may be made without departing from the scope thereof, it is intended that all matter contained in the above disclosure shall be interpreted as illustrative and not in a limiting sense.

We claim as our invention:

1. An electrically insulating member comprising a body of asbestos fibers and an inorganic binder therefor, and at least 2%, based on the weight of said body, of an impregnant applied to said body, the impregnant comprising solely a linear polysiloxane having the recurring group

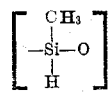

and end-blocking groups comprising $(CH_3)_3 Si$, the body with the applied polysiloxane impregnant having been heated at a temperature of from about 140° C. to 300° C. for at least several hours.

2. The member of claim 1 wherein the inorganic binder is Portland cement.

3. The member of claim 1 wherein the impregnant comprises between 8% and 11% of the weight of the body.

4. The member of claim 1 wherein the member with the applied polysiloxane has been heated for approximately 6 to 8 hours at 250° C. to 300° C.

References Cited in the file of this patent

UNITED STATES PATENTS

| 1,267,696 | Richards | May 28, 1918 |
| 2,428,053 | Vasileff | Sept. 30, 1947 |
| 2,469,890 | Patnode | May 10, 1949 |
| 2,588,393 | Kauppi | Mar. 11, 1952 |
| 2,588,828 | Greiner | Mar. 11, 1952 |
| 2,590,812 | Barry | Mar. 25, 1952 |
| 2,595,890 | Sauer | May 6, 1952 |

OTHER REFERENCES

Steel, pp. 79–83, 121 and 122, Apr. 22, 1946.